2,842,519
PROCESS FOR THE PRODUCTION OF A GRAFT COPOLYMER

Basil Alexander Ripley-Duggan, Harlow, England, assignor to The Distillers Company Limited, Edinburgh, Scotland, a British company No Drawing. Application May 24, 1955
Serial No. 510,865

Claims priority, application Great Britain June 12, 1954

8 Claims. (Cl. 260—45.5)

The present invention relates to graft copolymers derived from styrene and polymerizable cyclic ethers, in particular, alkylene oxides.

"Copolymers," as the term is usually used, covers those polymeric products obtained by the polymerisation of a mixture of two or more monomeric compounds. The resultant copolymers contain the polymerised monomeric groupings of all the monomers present, distributed within the molecule in a regular or random manner in proportions depending on the concentration of the monomers in the original mixture and on their reactivity ratios. In contrast to this "graft copolymers" as the term is used throughout this specification, covers polymeric products consisting essentially of polymeric chains derived from one polymerisable material (main chains) to which are chemically attached a number of polymeric chains derived from another polymerisable material (branch chains) the branch chains having one end free. This definition includes as "graft copolymers" polymeric materials in which the main chains are themselves copolymers (in the usual sense), and the branch chains are different copolymers (in the usual sense). The important structural characteristic of graft copolymers is that the chemical composition of the main chains is different from that of the branch chains.

It has now been found that particularly valuable graft copolymers may be obtained by attaching at intervals along a polymer chain consisting predominantly of styrene units, polymer chains derived from the polymerisation of a polymerisable cyclic ether.

Accordingly, the present invention provides a process for the production of a graft copolymer which comprises heating a polymerisable cyclic ether in a substantially anhydrous medium containing a hydroxy-alkylated polystyrene, as hereinafter defined, and an alkali metal or an alkali metal or an alkali metal oxide, hydroxide, hydride or alkoxide as catalyst for the reaction, whereby polymerisation of the cyclic ether with the formation of a graft copolymer occurs.

The cyclic ether to be used in the present invention must be capable of polymerising by the opening of the ether ring under the influence of the basic catalyst to form linear polymeric ethers which contain ether oxygen atoms linking ethylene, propylene or substituted ethylene or propylene residues together. Many such compounds are known and as examples may be mentioned ethylene oxide, its mono-substituted homologs and trimethylene oxide. Particularly useful derivatives of ethylene oxide are its mono-alkyl or alkenyl homologs containing not more than four carbon atoms, such as propylene oxide, 1,2-epoxybutane and 1,2-epoxybutene. The use of ethylene oxide is particularly preferred owing to the ease with which it polymerises to form graft copolymers. Other epoxide compounds which do not polymerise readily by themselves may, however, be present in the reaction mixture when they interact with the polymerisable cyclic ether and become incorporated in the graft copolymer side chains. Styrene oxide (phenylethylene oxide) is an example of such a less reactive epoxide.

The quantity of polymerisable cyclic ether used in the process of the present invention will depend on the number of free alcohol groups present in the hydroxy-alkylated polystyrene, on the length of polyether side chain desired in the graft copolymer and on the amount of catalyst employed. Preferably the cyclic ether should be used in at least a threefold molecular excess on the number of alcohol groups present in the hydroxy-alkylated polystyrene and this amount should be increased approximately $n$ times, where $n$ is the average number of ether residues it is desired to have in the polyether side chains.

By a "hydroxy-alkylated polystyrene" is meant throughout this specification those products containing alcoholic hydroxyl groups obtained by forming $\beta$- or gamma-hydroxy alkyl esters from the free carboxylic acid groups present in a styrene-unsaturated carboxylic acid copolymer consisting essentially of chains of from 10 to 100 polymerised styrene units per free carboxylic acid group. The preferred hydroxy-alkylated polystyrenes which react readily with the polymerisable cyclic ethers in the process of the present invention are those containing free primary alcoholic groups.

The hydroxy-alkylated polystyrenes will therefore contain one or more $HO(CXY)_n.O.CO—$ groups attached to a polymer chain predominantly composed of styrene units. In the above formula $n$ is 2 or 3 and X and Y may be hydrogen atoms or alkyl or aryl groups.

The esterification of the styrene copolymer to give the 1,2- and 1,3-glycol half esters may be carried out by any suitable process. Most conveniently these products are formed by reacting one of the above-mentioned cyclic ethers with the carboxylic acid groups present in the styrene copolymer, the preferred ether being ethylene oxide which forms ethylene glycol half esters and thus introduces the following groups into the copolymer: $HOCH_2.CH_2.O.CO—$. This reaction may be carried out by various known procedures such as, for instance, reacting the styrene copolymer, dissolved in an aqueous alkaline solution, with the cyclic ether at ambient temperatures.

The preferred procedure for the preparation of the hydroxy-alkylated polystyrene is that described in co-pending British application 17,349/54 which comprises reacting the styrene copolymer dissolved in a substantially anhydrous solvent with approximately one to three molar proportions of the cyclic ether at an elevated temperature and in the presence in the reaction mixture of a basic catalyst, preferably a tertiary amine such as pyridine, dimethylaniline, diethylaniline, quinoline, $\beta$-picoline and the lower alkyl-substituted pyridines.

The styrene-unsaturated carboxylic acid copolymer from which the hydroxy-alkylated polystyrene is derived may be obtained by any of the well-known techniques for the copolymerisation of styrene with unsaturated carboxylic acids. Many unsaturated acids are known to be capable of copolymerisation with styrene; the most readily available are the $\alpha,\beta$-unsaturated acids, and, as examples may be mentioned acrylic acid, methacrylic acid, cinnamic acid and maleic acid. It is essential that the proportion of styrene and unsaturated acid copolymerised should be such that the resultant coplymer contains on the average from 10 to 100 polymerised styrene units per polymerised unsaturated acid unit if useful graft copolymers are to be formed according to the process of the present invention.

The reaction of the hydroxy-alkylated polystyrene with the cyclic ether proceeds most efficiently with the production of polymeric ether side chains of suitable length in a strictly anhydrous medium which is, for instance, an inert solvent for the hydroxy-alkylated polystyrene such as benzene or toluene. Small quantities of water do not prevent the polymerisation taking place, but the yields of graft copolymers obtained under such conditions are considerably reduced owing to the reaction of the cyclic ethers with water with the production of by-product glycols.

The reaction requires an elevated temperature, for instance 80° C., and it is preferably carried out at a temperature in the range of 100-160° C. If the temperature at which the reaction is carried out is above the boiling point of the cyclic ether, superatomspheric pressures and closed reaction vessels must be employed in order to maintain the ether in the liquid reaction mixture.

The reaction of the polymerisable cyclic ethers with the hydroxy-alkylated polystyrene to form polymeric ether side chains is catalysed by the alkali metals and the alkali metal hydroxides, hydrides, oxides or alkoxides. These catalysts are generally insoluble in the substantially anhydrous reaction mixture and, therefore, they should be employed in a finely divided form. It is important to keep the catalyst completely dispersed throughout the reaction mixture because if good dispersion is not attained, cross-linked and gelled products may result. It is therefore preferred to keep the reaction mixture well stirred throughout the graft copolymerisation reaction.

The most suitable amount of catalyst depends on the cyclic ether and the particular catalyst employed and may be readily determined by experiment. When a strong catalyst such as an alkali metal hydroxide is employed considerably less catalyst is required than in the case of a weaker catalyst such as the alkali metal alkoxides derived from the lower alkyl alcohols.

The reaction of the cyclic ether with the hydroxy-alkylated polystyrene is allowed to continue until the polymerisation of the cyclic ether appears to be substantially complete. The reaction is readily followed, when superatmospheric pressures are employed, by studying the pressure in the reaction vessel which falls as the polymerisation of the cyclic ether proceeds.

When the reaction is complete the graft copolymer may be recovered by any conventional procedure. For instance, the inert solvent is distilled from the reaction mixture and the catalyst and any by-product glycols, which may have been formed in the process, are removed by extracting the distillation residue with water. The graft copolymers are then dried and are usually obtained as crumbly, soft solids.

It should be noted that the preparation of the hydroxy-alkylated polystyrene from the styrene copolymer containing free carboxyl groups by the preferred procedure described above and the further reaction of the hydroxy-alkylated polystyrene with the polymerisable cyclic ether to form the graft copolymer require very similar reaction conditions and, therefore, a preferred procedure for the production of graft copolymers is to react a styrene copolymer containing free carboxyl groups with a molecular excess (at least fourfold) of the polymerisable cyclic ether based on the number of carboxyl groups in the copolymer in the presence of a suitable basic catalyst and to allow the reaction to proceed with the formation of a graft copolymer. If an alkali metal or an alkali metal hydroxide, hydride, oxide or alkoxide is present in the reaction mixture the reaction will proceed with the production of a graft copolymer, but if only a weakly basic catalyst such as a tertiary amine is used to catalyse the first stage of the reaction, it will be necessary to add one of the above mentioned strongly basic catalysts to the reaction mixture in order that the polymerisation reaction may go through to completion. Particularly valuable results are obtained by employing mixtures of weakly basic and strongly basic catalysts together and the above preferred procedure is particularly valuable when such catalyst mixtures are employed.

In addition to aiding the formation of the graft copolymers by the process of the present invention, the presence of weakly basic catalysts such as tertiary amines in the reaction mixture has an advantageous effect on the properties of the resultant graft copolymers in that they reduce the tendency of the polymerising cyclic ethers to form cross-linked products.

The graft copolymers produced by the process of the present invention are particularly valuable because they combine the amorphous properties of polystyrene with the crystalline properties of polyethers, e. g. polyethylene oxide. They find many uses as coating compositions and as adhesives for instance, in the preparation of laminated articles, and they may be cross-linked subsequent to their formation by reaction with diisocyanates to produce elastic products useful in films and foils for wrapping and other purposes. The graft copolymers of the present invention have the further advantageous property of reducing the surface resistivity and the rate of loss of electrostatic charges of polystyrene compositions to which they are added. They may therefore be used as antistatic agents for polystyrene and may either be mixed with the styrene monomer before it is polymerised or incorporated in a polystyrene moulding powder or sprayed on to an article made of polystyrene. Polystyrenes so treated show greatly improved resistance to dust pick-up, which is one of the major disadvantages of polystyrene mouldings.

The following examples illustrate specific embodiments of the process of the present invention; the parts by weight and parts by volume bear the same relationship to each other as do grams to cubic centimetres.

*Example 1*

A copolymer was prepared by heating 520 parts by weight of styrene and 18 parts by weight of acrylic acid dissolved in methyl ethyl ketone at 80° C., using benzoyl peroxide as catalyst, and was isolated by precipitation with an alcohol. The copolymer was then dried and, on analysis, was shown to contain 3.42% by weight acrylic acid units and thus it contained on the average chains of approximately 20 polymerised styrene units between each polymerised acrylic acid unit.

A 1.3 litre stainless steel vessel, equipped with a stirrer and pressure gauge, was carefully dried and charged with a solution of 7.5 parts by weight of the sytrene-acrylic acid copolymer dissolved in 750 parts by volume of sodium-dried toluene. After addition of 15 parts by weight of sodium methoxide and 2.5 parts by volume of dry pyridine the dead space was flushed with nitrogen; 22.5 parts by volume of dry ethylene oxide were added and the reactor immediately sealed. The vessel was placed in an oil-bath at 110° C. and the stirred contents heated for 68 hours. After cooling, the contents were filtered, and the toluene evaporated off under reduced pressure. The residual solid was thrice extracted with warm water and then dried. There were obtained 7.9 parts by weight of a crumbly solid. Ultimate analysis indicated the presence of 20% by weight of ethylene oxide units.

Films of this polymer, cast on glass from a benzene solution and containing 5% w./w. of 2,4-tolylene diisocyanate, were baked at 115-120° for 2 hours. The resulting film adhered powerfully to the glass and could not be stripped.

Very similar results are obtained by replacing the sodium methoxide catalyst with an equivalent quantity of sodium ethoxide or potassium butoxide.

*Example 2*

Employing the equipment, procedure and styrene-acrylic acid copolymer as described in Example 1, the following charge was heated at 130° C. for 68 hours.

| | | |
|---|---|---|
| Styrene-acrylic acid copolymer | parts by weight | 15 |
| Sodium-dried toluene | parts by volume | 750 |
| Dry pyridine | do | 5.5 |
| Powdered KOH | parts by weight | 0.25 |
| Dry ethylene oxide | parts by volume | 45 |

The pressure in the vessel rose to 48 pounds per square inch (p. s. i.) in 2 hours; after 9 hours it had fallen to 5 p. s. i., indicating that polymerization was substantially complete in that time.

After evaporation of the toluene and thrice-repeated extraction with water of the residue, 25.8 parts by weight of dry graft copolymer was obtained. Ultimate analysis indicated an ethylene oxide unit content of 41%.

Films cast from solutions of this polymer were soft and waxy, but could be cross-linked at room temperature by 2,4-tolylene diisocyanate. The cross-linked copolymer was insoluble, and films could be cold-drawn therefrom, i. e. extended irreversibly under tension, which exhibited the phenomenon of "necking." Such cold-drawn films had good tensile properties, being tough and elastic, and showing a slow recovery after stretching.

Repetition of the above example in the absence of the potassium hydroxide gave a polymer containing only about 4% ethylene oxide units thus indicating that substantially no polymerisation with the formation of polyether side chains had taken place. The use of an equivalent quantity of sodium hydroxide in place of the potassium hydroxide gave a good yield of a graft copolymer.

*Example 3*

Employing the equipment, procedure and copolymer as described in Example 1, the following charge was heated at 130° for 66 hours:

| | |
|---|---|
| Styrene-acrylic acid copolymer __parts by weight__ | 15 |
| Sodium-dried toluene _____parts by volume | 750 |
| Pyridine _____do____ | 3 |
| KOH powder _____parts by weight__ | 1 |
| Dry ethylene oxide _____parts by volume__ | 45 |

The polymer was recovered as described in Example 1 and constituted 28.0 parts by weight. Ultimate analysis indicated the presence of 46% ethylene oxide units.

Films cast from solutions of this polymer were weak and brittle, but when cross-linked by baking with 5% 2,4-tolylene diisocyanate for several hours, could be drawn when hot, after which drawing they exhibited some toughness and elasticity.

When styrene containing 10% of this polymer was polymerised to a low monomer content, the surface resistivity of the resultant polystyrene was greatly reduced, and the rate of loss of an induced electrostatic charge was greatly increased.

*Example 4*

Employing the equipment, procedure and copolymer described in Example 1, the following charge was heated to 130° C. for 53 hours:

| | |
|---|---|
| Styrene-acrylic acid copolymer___parts by weight__ | 15 |
| Dry benzene_____parts by volume__ | 750 |
| Ethylene oxide_____do____ | 45 |
| KOH powder_____parts by weight__ | 1.0 |

The pressure in the vessel rose to 47 p. s. i. in 1 hour. After 5 hours the pressure had fallen to 20 p. s. i., at which value it remained constant, indicating that polymerisation was complete. After the usual treatment, 17.5 parts by weight of dry graft copolymer were recovered, having an ethylene oxide content of 24% as indicated by ultimate analysis.

Films of this polymer cast on glass surfaces were tough and slightly rubbery after cross-linking with 5% 2,4-tolylene diisocyanate. They adhered extremely strongly to the glass and could not be stripped therefrom.

*Example 5*

Employing the equipment, procedure and copolymer as described in Example 1, the following charge was heated at 135° C.

| | |
|---|---|
| Styrene-acrylic acid copolymer___parts by weight__ | 15 |
| Dry benzene_____parts by volume__ | 750 |
| Ethylene oxide_____do____ | 20 |
| Dry pyridine_____do____ | 2.5 |
| KOH powder_____parts by weight__ | 0.25 |

The pressure rose to 52 p. s. i. and then fell steadily to 25 p. s. i. over a period of 46 hours. After the usual water extraction, 25.9 parts by weight of dry polymer were obtained. Films of this polymer, after cross-linking by baking with 5% 2,4-tolylene diisocyanate, could be drawn when hot. After such drawing the films were tough and elastic, and could be flexed without cracking.

*Example 6*

The following substances were charged to a stainless steel bomb:

| | |
|---|---|
| A styrene-acrylic acid copolymer containing 3.23% acrylic acid w./w_____parts by weight__ | 20 |
| Dry benzene_____parts by volume__ | 200 |
| Pyridine _____do____ | 0.1 |
| KOH_____parts by weight__ | 0.2 |
| Ethylene oxide_____parts by volume__ | 60 |

The bomb was heated for 16 hours at 130° C. After the usual procedure, 35 parts by weight of a graft copolymer were obtained. This was soluble in methanol and ethanol, which are non-solvents for the starting copolymer. Ultimate analysis indicated an ethylene oxide content of 52%.

When styrene containing 5% of this graft copolymer was polymerised to a low monomer content, the resulting polymer had a much-reduced surface resistivity, and an increased rate of loss of induced static charges.

The following Examples 7 and 8 illustrate how the presence of a tertiary amine catalyst in the reaction mixture reduces the tendency for a gel cross-linked product to be formed.

*Example 7*

Employing the equipment, procedure and styrene-acrylic acid copolymers described in Example 1, the following charge was heated at 135° C. for 18½ hours.

| | |
|---|---|
| Styrene-acrylic acid coploymers___parts by weight__ | 15 |
| Dry toluene_____parts by volume__ | 750 |
| Ethylene oxide_____do____ | 60 |
| KOH powder_____parts by weight__ | 0.5 |

The pressure rose to 55 p. s. i. in 1 hour; after a total period of 4 hours if fell to a constant value of 17½ p. s. i. The reaction product was a highly swollen gel, indicating that some degree of cross-linking of the polymer had occurred.

*Example 8*

Employing a charge as in Example 7, but with the addition of 5 parts by volume of pyridine, polymer weighing 22 parts by weight was recovered after the usual treatment. This was soluble in acetone, benzene, methanol and ethanol. Films made from this polymer, containing 2,5-tolylene diisocyanate, cross-linked at 45–50°. They were self supoprting and could be cold-drawn nearly 100% to strong elastic films.

I claim:

1. A process for the production of a graft copolymer which comprises polymerising a cyclic ether selected from the group consisting of ethylene oxide and its alkyl and alkenyl homologs containing not more than four carbon atoms and trimethylene oxide in the presence of a styrene/unsaturated carboxylic acid copolymer containing from 10 to 100 polymerised styrene units per carboxylic acid group in which the carboxyl groups have been esterified with one hydroxy group of a glycol, the other hydroxy group remaining as such, by heating the mixture in an anhydrous medium to a temperature above 80° C. in the presence of a polymerisation catalyst selected from the group consisting of the alkali metals and the alkali metal oxides, hydroxides, hydrides and alkoxides.

2. A process as claimed in claim 1, wherein the cyclic ether is ethylene oxide.

3. A process as claimed in claim 1, wherein the cycle ether is used in at least a three-fold molecular excess on the number of hydroxy groups present in the esterified styrene copolymer.

4. A process as claimed in claim 1, wherein the carboxyl groups of the styrene copolymer have been converted into ethylene glycol half esters.

5. A process as claimed in claim 1, wherein the polymerisation is carried out at a temperature in the range 100 to 160° C.

6. A process as claimed in claim 1, wherein the catalyst is maintained completely dispersed throughout the reaction mixture by stirring.

7. A process for the production of a graft copolymer which comprises reacting a styrene/unsaturated carboxylic acid copolymer containing from 10 to 100 polymerised styrene units per carboxylic acid group with at least a four-fold molecular excess on the carboxylic acid groups of a polymerisable cyclic ether selected from the group consisting of ethylene oxide and its allkyl and alkenyl homologs contains not more than four carbon atoms and trimethylene oxide in a substantially anhydrous medium at a temperature above 80° C. in the presence of a catalyst selected from the group consisting of the alkali metals, and the alkali metal oxides, hydroxides, hydrides and alkoxides.

8. A process as claimed in claim 7, wherein an aromatic tertiary amine having only hydrocarbon substituents is present in the reaction mixture.

References Cited in the file of this patent

UNITED STATES PATENTS

| | | |
|---|---|---|
| 2,047,398 | Voss | July 14, 1936 |
| 2,607,761 | Seymour | Aug. 19, 1952 |

OTHER REFERENCES

"Industrial and Engineering Chemistry," volume 41, May-Aug. (1949), pages 1509 to 1512.